April 26, 1932.  F. N. G. KRANICK  1,855,838
TRACTOR MOWER
Filed Jan. 23, 1931   2 Sheets-Sheet 1

INVENTOR.
FRANK N. G. KRANICK
BY James A. Walsh.
ATTORNEY

April 26, 1932.  F. N. G. KRANICK  1,855,838
TRACTOR MOWER
Filed Jan. 23, 1931     2 Sheets-Sheet 2.
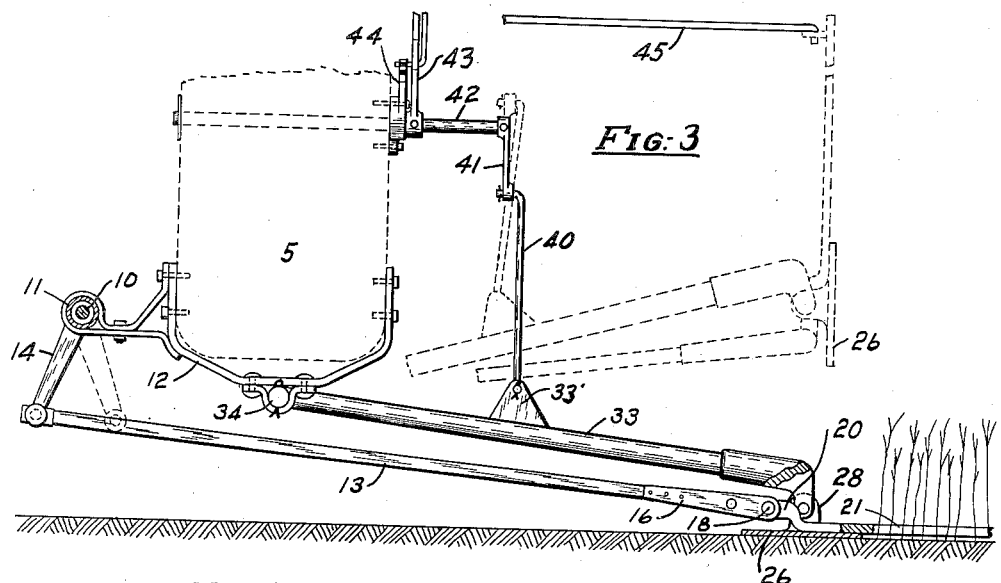
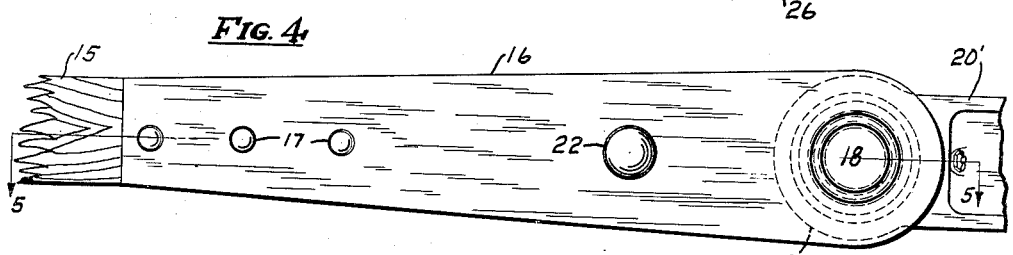
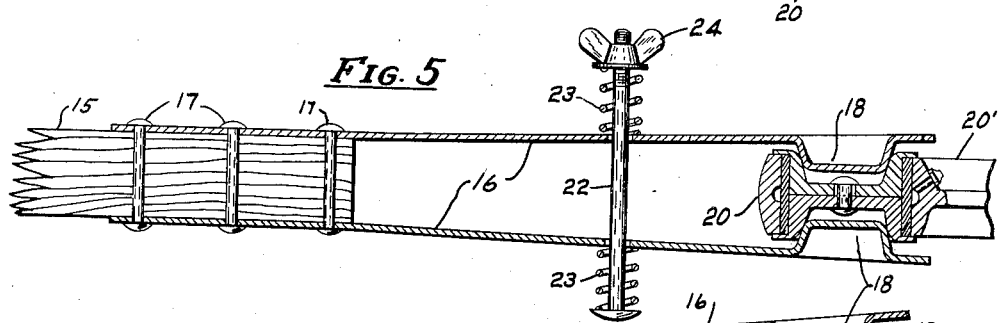
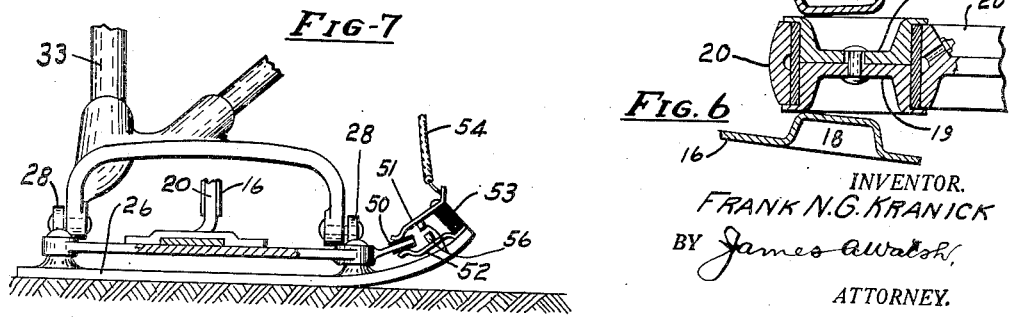
INVENTOR.
FRANK N. G. KRANICK
BY James A. Walsh
ATTORNEY.

Patented Apr. 26, 1932

1,855,838

UNITED STATES PATENT OFFICE

FRANK N. G. KRANICK, OF RACINE, WISCONSIN, ASSIGNOR TO J. I. CASE COMPANY, OF RACINE, WISCONSIN, A CORPORATION

TRACTOR-MOWER

Application filed January 23, 1931. Serial No. 510,595.

My present invention relates to mower equipment for tractors of a character adapted to be readily attached to and removed therefrom, and which is comparatively simple in construction and operation, embodying improvements in certain details of construction and arrangements of parts whereby the attachment can be made without alteration of the tractor.

Figure 1:
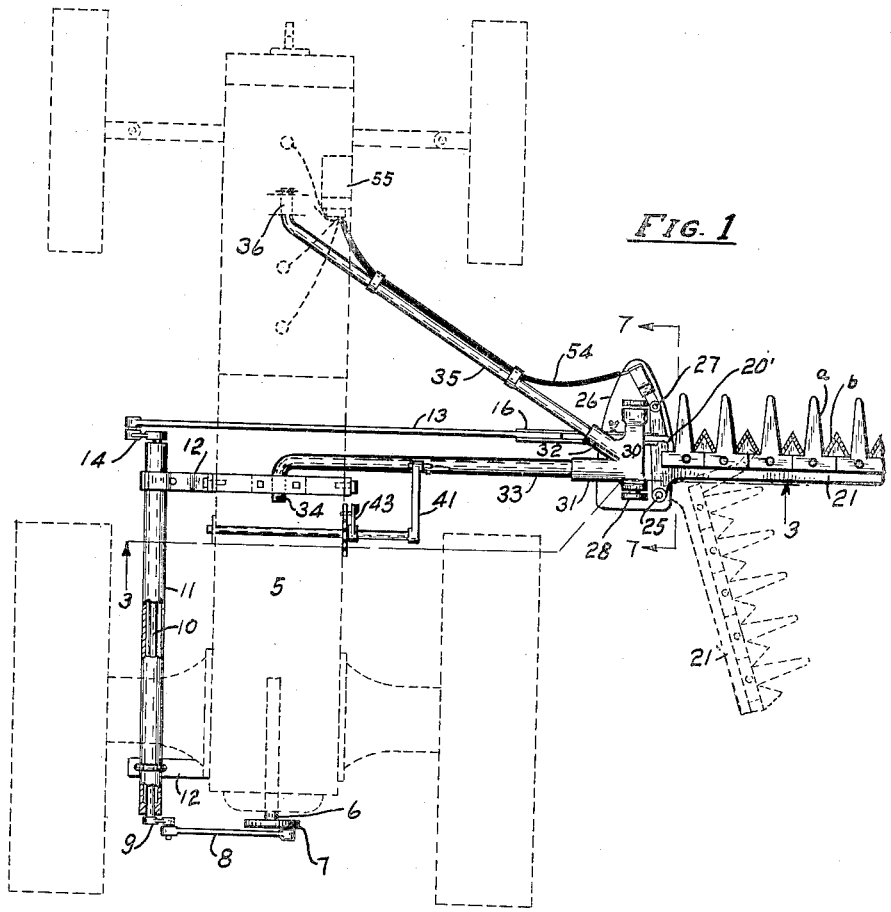
Figure 2:
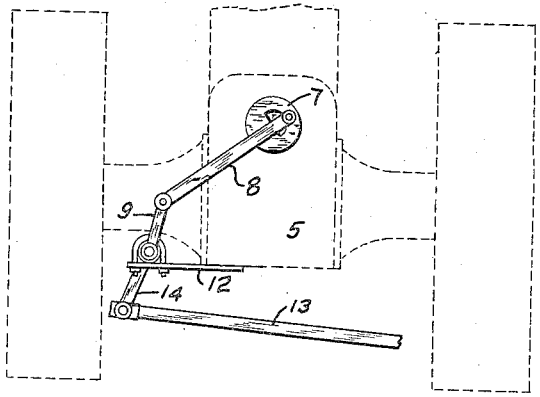

In the accompanying drawings, forming part hereof, Figure 1 is a plan view indicating a tractor with my improvement attached thereto; Fig. 2, a rear elevation; Fig. 3, a transverse sectional view taken on the dotted line 3—3 in Fig. 1; Fig. 4, a fragmentary elevation of the mower pitman; Fig. 5, a longitudinal section of said pitman taken on the dotted line 5—5 in Fig. 4; Fig. 6, a detail section showing the pitman in the act of separating from the cutting mechanism; and Fig. 7 is a detail of means which I may employ for discontinuing operation of the tractor when the cutting mechanism strikes obstructions and is thereby rendered inoperable, as seen when looking in the direction indicated by the dotted lines 7—7 in Fig. 1.

In said drawings the numeral 5 indicates a tractor having a power take-off shaft 6 upon which I mount a crank-wheel 7 which reciprocates the pitman 8 secured thereto and to the arm 9. Said arm 9 is connected to a driven shaft 10 enclosed in a casing 11 supported by suitable brackets as 12, and to which shaft I connect a mower pitman 13 by means of the arm 14, said pitman preferably comprising a wooden section 15 to which yielding connecting arms 16 are secured as by rivets 17. Grips 18 of an indented or projecting character are formed in the arms 16 or associated therewith, which are adapted to normally fit into the recesses or seats 19 in the pitman-bearing 20, 20', forming part of the cutter-bar assembly 21, hereinafter called the cutter-bar, to provide a separable connection between it and the pitman for a purpose to appear, and by employing a bolt 22 passing through the arms and controlled at opposite sides thereof by springs 23 the gripping or binding force of the arms may be regulated by adjusting the thumb-nut 24 so that the degree of tightness between the connected pitman and bearing 20, 20', may be arranged as desired. It will be understood that where preferable I may provide the pitman in two sections connected by a slip joint instead of jointing said pitman directly to the cutter-bar.

The inner end of the cutter-bar 21 is pivotally connected, at 25, to the shoe 26, its forward side being secured thereto by a shear pin 27, and on said shoe 26, in ears 28 thereof, I pivotally mount a bracket 30 embodying sockets 31, 32, in which socket 31 is supported a brace rod 33, its opposite end being pivotally connected to the tractor, at 34, while in socket 32 I mount a brace-rod 35 which at its opposite end is also pivotally connected to the tractor, at 36, so that the two rods and bracket 30 constitute a swinging frame for raising and lowering the cutter-bar, and which latter may be folded into vertical position, through its pivotal connection with the bracket 30, as indicated by the dotted lines in Fig. 3. To the bracerod 33, at 33', I secure a link 40, connected at its upper end to the arm 41, which latter in turn is rigidly connected to the rockshaft 42 and actuated by a lever 43 and quadrant 44 of a common and well known construction and arrangement. As pitman 13 is pivotally connected to arm 14, and the brace-rods 33, 35, are pivotally connected at one end to the tractor, it will be apparent that by manipulating the lever 43 to rock the shaft 42 the cutter-bar may be raised from the ground, and as the shoe 26 is pivotally connected to bracket 30 the cutter-bar 21 may be adjusted to vertical position as indicated in Fig. 3 and so sustained, as by a rod 45 connected thereto and of a part to the tractor.

In operation, it will be understood that the mower equipment is in the position indicated in full lines in Fig. 1, the pitman 8 on power shaft 6 through its interconnecting relation with mower pitman 13, reciprocating the latter to impart like motion to the cutting mechanism in a well known manner. Should an unusually tough or large stalk become wedged between a knife and a guard, as $a$, $b$, Fig. 1, the pitman 13 on its inner stroke, because of its separable connection with the cutter-bar bearing 20, 20', will pull away from the latter, as indicated in Fig. 6, and become disconnected, rendering the cutting mechanism inoperative and thus preventing damage thereto, and when such condition has been removed said pitman may be readily again connected to the cutter-bar bearing, as shown in Fig. 5, to resume actuation of the cutting mechanism.

It will be further understood that a tractor for performing the work referred to travels at considerable speed, and should the cutting mechanism violently contact with an obstruction, it is imperative, in order to prevent serious damage to the implement, that means be provided whereby operation of the cutter-bar will simultaneously cease upon such contact, which I accomplish by the shear pin 27 normally securing the sickle frame to the shoe 26, which shear pin upon the occurrence referred to will become sheared by the cutter-bar, and the latter, being pivotally connected at 25, will be swung rearwardly in a horizontal direction by the force of contact with the obstruction to the position indicated by dotted lines in Fig. 1. In Fig. 7 it will be observed that I provide an insulated plug 50 on the cutter-bar, which normally is gripped by the jack comprising the spring members 51, 52, which jack is mounted upon the shoe and the member 51 insulated therefrom, at 53, while member 52 is grounded, a lead wire 54 being connected to the jack and with a magneto 55 forming part of a tractor equipment. In an emergency as stated, when the cutter-bar is thrown backwardly, as indicated in Fig. 1, the plug 50 simultaneously becomes disconnected from the jack, with the result that the contacting points 56 of the jack members will be engaged through the spring force of the members, 51, 52, whereupon short circuiting of the magneto 55 will occur, and the travel and operation of the tractor and implement thus instantly stopped.

By my improvement it will be observed that the weight of the equipment is so distributed at either side of the tractor as to be well balanced to obviate undue strain to the tractor, and by providing the swinging frame comprising the bracket 30 and supporting rods 33, 35, pivoted medianly in longitudinal relation to the tractor, free vertically swinging movement may be imparted to the frame for adjusting the same, so that when the tractor is moving over roads and the like the mower may be vertically positioned and the complete equipment thus carried in comparatively compact condition. In Fig. 7 I have for illustrative purposes shown an example for short-circuiting the magneto when obstructions are encountered, but desire it to be understood that any practical means may be employed for rendering the tractor-mower inoperative as emergencies arise. In employing a power shaft of substantially the character described it will be understood also that the same runs constantly at the speed of the engine regardless of the varying speed of travel of the tractor, and therefore no matter whether the tractor is moving fast or slow the cutter-bar will continue operating at its normal cutting speed, so that proper cutting of the crop is at all times assured while the engine is in action.

I claim as my invention:

1. The combination, with a tractor having a power take-off shaft, of a pitman, means connecting said shaft and pitman for reciprocating the latter, a cutter-bar, means for separably connecting the pitman and cutter-bar, a shoe, means connecting the cutter-bar and shoe whereby said cutter-bar may swing horizontally, and means connecting the shoe to the tractor whereby said shoe may be swung vertically and said cutter-bar folded in relation to the tractor.

2. The combination, with a tractor having a power take-off shaft, of a pitman, means connecting said shaft and pitman for actuating the latter, a swinging frame connected to the tractor, a horizontally swinging cutter-bar supported by the frame, means connecting the pitman and cutter-bar whereby the latter may be disconnected from the pitman when swung horizontally, and means for actuating the swinging frame to vertically adjust the cutter-bar in relation to the ground.

3. The combination, with a tractor having a power take-off shaft, of a pitman, means connecting said shaft and pitman for actuating the latter, a swinging frame connected to the tractor, a horizontally swinging cutter-bar supported by the frame, means connecting the pitman and cutter-bar whereby the latter may be disconnected from the pitman when swung horizontally, means for actuating the swinging frame to vertically adjust the cutter-bar in relation to the ground, and means for folding the cutter-bar in relation to the tractor.

4. In an implement attachment for a tractor having a power take-off shaft, a driven shaft geared to and actuated by the power shaft and positioned at one side of the tractor, a cutter-bar at the opposite side of the tractor, a frame pivotally mounted on the tractor and supporting the cutter-bar, means for vertically adjusting the frame to raise and lower the cutter-bar, and means connected to the driven shaft and separably connected to the cutter-bar for actuating the latter.

5. In an implement attachment for a tractor having a power take-off shaft and a source of electrical energy, a driven shaft geared to and actuated by the power shaft, a pitman connected to the driven shaft, a shoe, a cutter-bar, pivotal means connecting the shoe to the cutter-bar whereby the latter may be swung horizontally, means connecting the shoe and cutter-bar for normally retaining the latter in cutting position, means for connecting the cutter-bar to the source of electrical energy, and separable means connecting the pitman and cutter-bar whereby as the latter strikes obstructions the retaining means will be released and the cutter-bar swung horizontally on its pivotal connection with the shoe to disconnect said pitman and also disconnect said electrical connection to render the tractor and cutter-bar inoperative.

6. In an implement attachment for a tractor embodying a power take-off shaft, a driven shaft geared to and actuated by the power shaft, a cutter-bar, means for raising and lowering the cutter-bar in relation to the ground, and a pitman connected to the driven shaft and separably connected to the cutter-bar for actuating the latter said pitman embodying yielding means for engaging and disengaging said cutter-bar.

7. In an implement attachment for a tractor embodying a power take-off shaft, a pitman, means connecting the power shaft and pitman for actuating the latter, a vertically swinging frame mounted on the tractor, a cutter-bar supported by the frame, means connecting the pitman and said cutter-bar, and means for raising and lowering the pitman, frame and cutter-bar in relation to the ground.

8. In an implement attachment for a tractor embodying a power take-off shaft, a pitman geared to and actuated by said shaft, a cutter-bar embodying a shoe, a bracket on the shoe, brace-rods connected to the tractor and to the bracket, separable means connecting the pitman and cutter-bar and means for simultaneously raising and lowering the cutter-bar, shoe, pitman and rods in relation to the ground.

9. In an implement attachment for a tractor embodying a power take-off shaft, a pitman geared to and actuated by said shaft, a horizontally and vertically swinging cutter-bar connected to the pitman, means for automatically disconnecting said pitman and cutter-bar when the latter swings horizontally, and means associated with the cutter-bar and tractor for discontinuing the operations thereof when the cutter-bar is forced horizontally and rearwardly.

10. In an implement attachment for a tractor embodying a power take-off shaft, a pitman geared to and actuated by said shaft, a horizontally swinging cutter-bar connected to the pitman, and means associated with the cutter-bar and tractor for discontinuing the operation of both when the cutter-bar is forced horizontally and rearwardly by contact with obstructions.

11. In an implement attachment for a tractor embodying a power take-off shaft, a pitman geared to and actuated by said shaft, a cutter-bar having a bearing, and yielding means associated with the pitman for normally connecting the same with said bearing and separating therefrom when the cutter-bar is swung rearwardly in a horizontal direction.

12. In an implement attachment for a tractor having a power take-off shaft, a pitman geared to and actuated by said shaft said pitman embodying releasable means, a cutter-bar having a bearing normally engaged by said releasable means, means for pivotally supporting the cutter-bar, and means for normally retaining the cutter-bar in cutting position and releasable thereby upon contact of the cutter-bar with obstructions whereby said cutter-bar will swing horizontally on its pivotal support and be disconnected from said releasable means.

13. In an implement attachment for a tractor embodying a power take-off shaft, a cutter-bar having a shoe, means geared to said shaft and connected to the cutter-bar for actuating the latter, a shear pin connecting the cutter-bar and shoe, and means for pivotally connecting the cutter-bar to the shoe whereby when the cutter-bar contacts with obstructions said shear pin will be severed and the cutter-bar swung horizontally in relation to the tractor.

14. In an implement attachment for a tractor embodying a power take-off shaft, a horizontally swinging cutter-bar having a shoe, means connecting the power shaft to the cutter-bar for reciprocating the latter, means for pivotally connecting the cutter-bar to the shoe, and also other means connecting the cutter-bar to the shoe whereby when the cutter-bar strikes obstructions said means will disconnect the cutter-bar to swing horizontally on its pivotal connection.

In testimony whereof I affix my signature.

FRANK N. G. KRANICK.